C. GEISKING.
DEVICE FOR COUPLING, UNCOUPLING, AND MANIPULATING AIR BRAKE HOSE.
APPLICATION FILED MAR. 7, 1908.
916,858.
Patented Mar. 30, 1909.
2 SHEETS—SHEET 1.
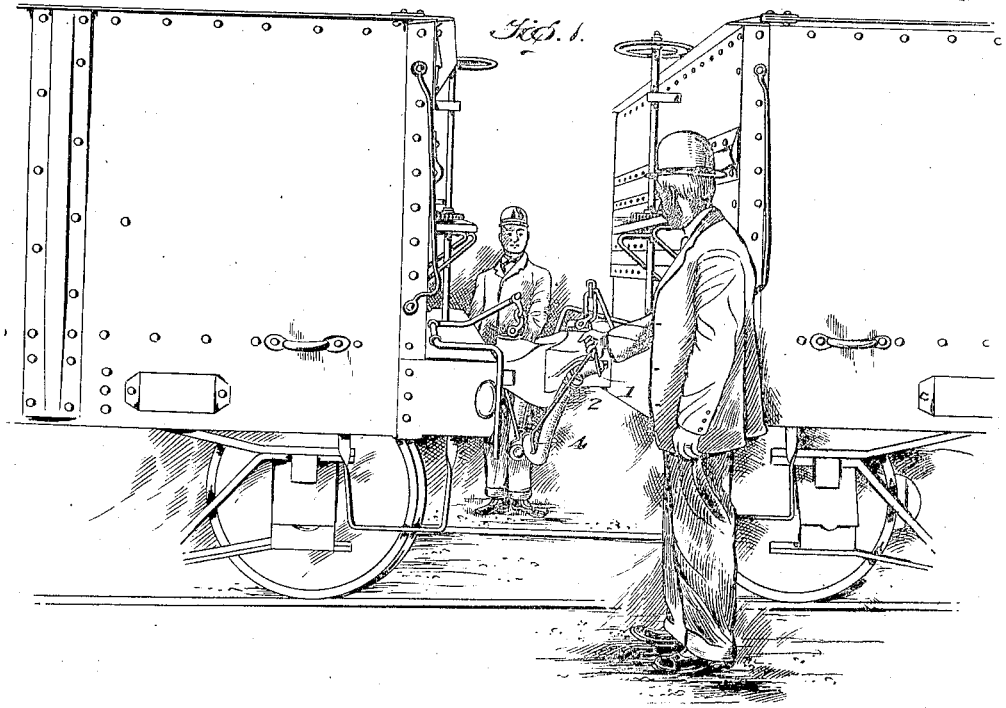
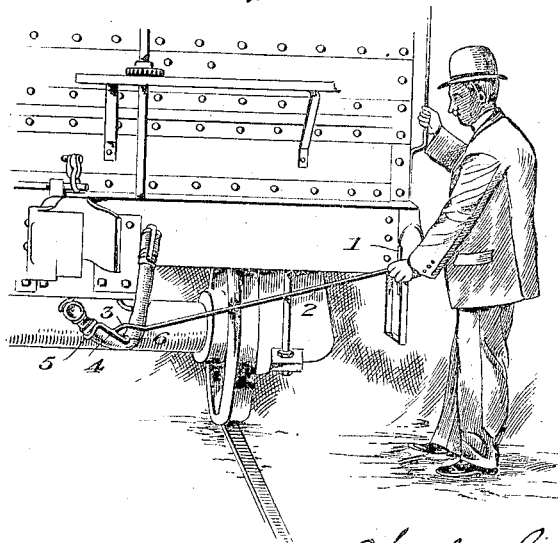
Witnesses
Inventor
Charles Geisking
By
Attorney

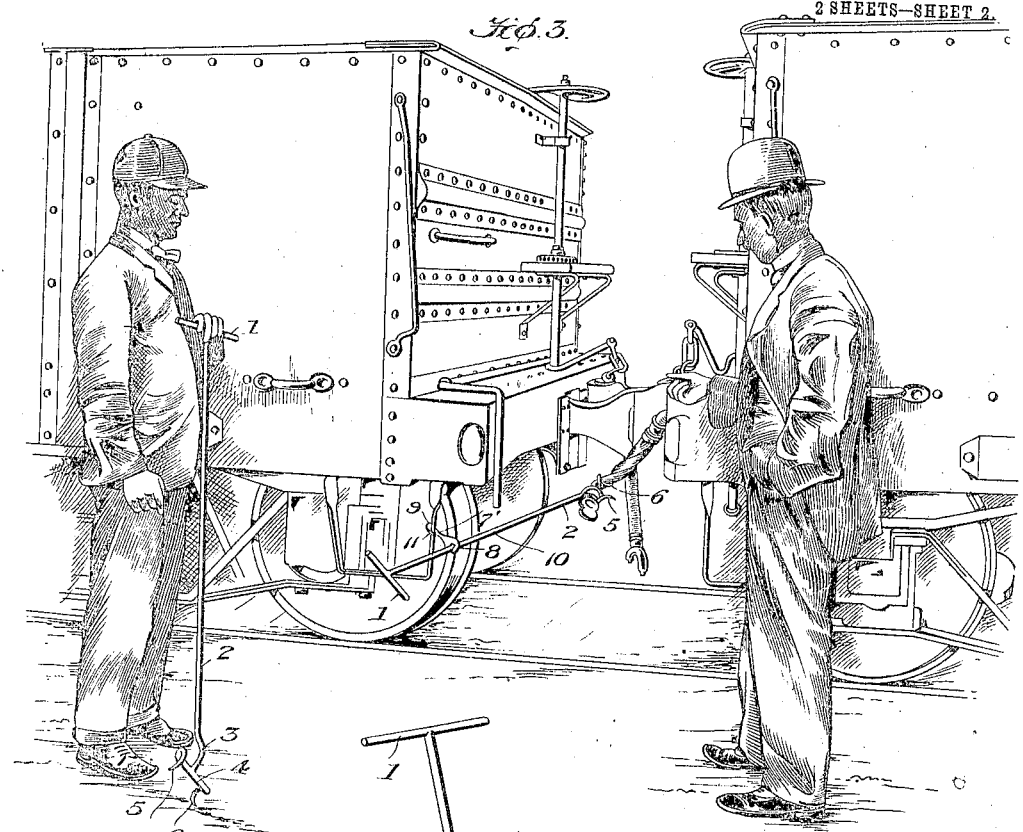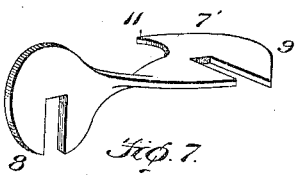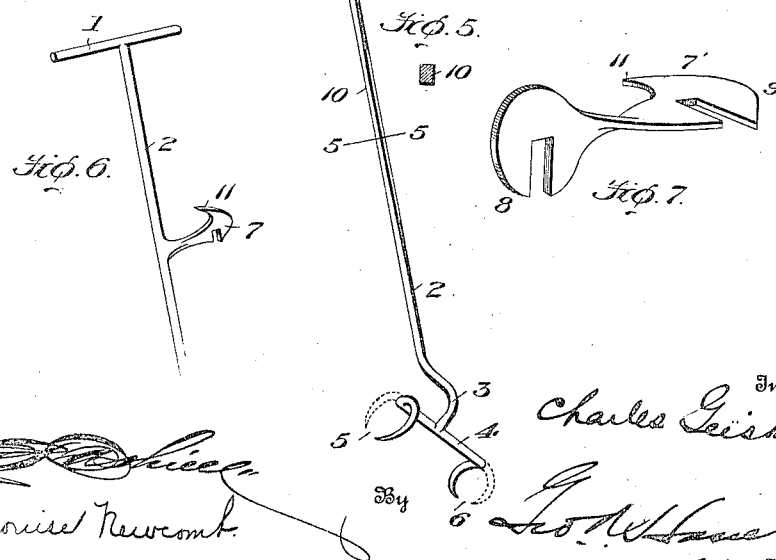

UNITED STATES PATENT OFFICE.

CHARLES GEISKING, OF HARRISBURG, PENNSYLVANIA.

DEVICE FOR COUPLING, UNCOUPLING, AND MANIPULATING AIR-BRAKE HOSE.

No. 916,858.  Specification of Letters Patent.  Patented March 30, 1909.

Application filed March 7, 1908. Serial No. 419,791.

*To all whom it may concern:*

Be it known that I, CHARLES GEISKING, a citizen of the United States, residing at Harrisburg, county of Dauphin, and State of Pennsylvania, have invented certain new and useful Improvements in Devices for Coupling, Uncoupling, and Manipulating Air-Brake Hose, of which the following is a specification.

My invention relates to devices for coupling, uncoupling and manipulating air brake hose.

Heretofore in coupling or uncoupling air brake hose on cars, or in manipulating hose when applying gaskets to the couplings, it has been necessary for the trainman to get in under the ends of the cars and accomplish these operations by hand, except with those devices where an automatic coupling of the air brake hose is effected when the cars come together, such devices being, however, of complicated and delicate construction and usually not well adapted for modern freight car usage. In coupling and uncoupling or manipulating air brake hose, the trainman is constantly in danger of bodily injury or death, because when in the stooping posture necessary for him to assume when reaching for the air brake hose by hand, his position is not observable by the engineer or other trainmen, especially where the train is long or on a curve. Many trainmen have been injured or killed while thus handling the air brake hose on freight trains.

The object of the present invention is to provide a simple, durable and inexpensive tool which can be readily carried by trainmen and manipulated with rapidity and facility in grasping the ends of the air brake hose to cause coupling or uncoupling thereof, or manipulation to bring the coupling in convenient position to apply gaskets, all while the trainman is standing at the side of the car and without requiring him to place any portion of his body in a dangerous position.

The invention also has for its object the provision of a device for temporarily attaching the tool to the car when the tool is being used to manipulate the air brake hose for the placement of a gasket in the coupler thereof so that both hands of the trainman will be free for such operation.

So far as I am aware, I am the first to provide a tool of the character set forth, and while I have disclosed in the accompanying drawings and in the following specification the most perfect embodiment of my invention which I have at this time devised, I am aware that many changes of construction can be resorted to without in any manner detracting from the advantages of the invention or changing its manner of operation or manipulation, and I, therefore, lay claim to all changes and improvements comprehended within the general scope of the invention and intend that my claims shall be so construed.

In the accompanying drawings:—Figure 1 is a view illustrating the use of the tool in coupling air brake hose; Fig. 2 shows how the tool may be used to couple or uncouple the hose; Fig. 3 is a view showing the hose held by the tool for the insertion of a gasket; Fig. 4, a detail perspective of the tool; Fig. 5, a cross-section on line 5—5 of Fig. 4; Fig. 6, a detail view showing how the attaching device may be made integral with the tool; and Fig. 7, a detail of the attaching device.

The tool may be formed of a single piece of iron or steel, which may be of any desired cross-sectional shape, being provided with a suitable handle 1 of any desired form, either straight, looped, or otherwise constructed, a shank 2 of suitable length, a bend 3, and a head 4 having hooks 5 and 6. The head 4 may be disposed at any suitable angle to the shank 2, and the bend 3 may assume any desired form and size in connection with the head 4, according to conditions of use.

The hooks 5 and 6 are reversely disposed. The hooks or prongs 5 and 6 may assume different forms, as they may be more or less of V-shape, U-shape, curved (as shown), and said hooks may be double, as indicated by dotted lines. More than two of these hooks or prongs may be provided on the head, if desired.

As shown in Fig. 6, the shank 2 may be provided with an attaching device 7 to hold the tool to the car step or other suitable part of the car when the tool is used to manipulate the air brake hose to permit placing a gasket therein, said device being of any desired construction. This attaching device may be formed separately, as shown at 7' in Figs. 3 and 7, in which case it may be formed with one or more jaws 8, 9, in the heads thereof which may be at right angles to each other, said jaws being adapted to engage a flattened portion 10 on the shank 2. The attaching device may have one or more hooks 11 to engage the strap step on the car or any other suitable object, as shown in Fig. 7.

If it is desired to couple the air brake hose, the operator, grasping the tool, while standing at the side of the car, (Fig. 1) places it under the depending air brake hose end, and by giving the handle 1 a twist, causes the downwardly extending hook 5 to receive the air brake hose, and the upwardly extending hook or prong 7 to engage the top part of the air brake hose, one man standing on one side of the train, and another man on the other side of the train, each manipulating one end of the hose, and by conjoint action snapping the couplings together. Both men may walk to the next car which is to be coupled and couple the hose in the same fashion. The coupling operation may also be carried on by but one man standing at the side of the train and using two of the tools, one in each hand, or, by using one of the tools in one hand and a suitable hook or prong in the other hand. Hose already coupled can be uncoupled by a single man who causes the prongs 5 and 6 to grasp one of the hose ends in the manner indicated, and by giving the handle 1 a twist, the coupling becomes detached.

When it is desired to renew a gasket in the hose coupling, the end of the hose is made to enter the crook formed by the bent part 3 and the head 4, and the handle 1 is then turned to bring prong 6 into engagement with the hose. The hose may then be slightly twisted and pulled toward the side of the car, as shown in Fig. 3, whereupon the attachment 7 or 7' may be brought into use to hold the tool engaged with the car step or other suitable part of the car. The trainman then has both hands free to place the gasket.

By repeated trials I have found that coupling and uncoupling of the air brake hose or the manipulation thereof for placing a gasket can be accomplished in substantially the same time it would take a man to do the work by using his bare hands, and that the hose is not damaged in any manner by the use of the tool.

Having thus described my invention, what I claim as new and desire to secure by Letters Patent, is:—

1. A tool for coupling or uncoupling air brake hose having a shank, a head disposed crosswise thereof, and rigid therewith and a plurality of reversely arranged devices on said head adapted for grasping the air brake hose.

2. A tool for coupling or uncoupling air brake hose having a shank, a head whose length is disposed at an oblique angle to the shank, and a plurality of devices carried by the head adapted for engaging the air brake hose.

3. A tool for coupling or uncoupling air brake hose having a shank, a head whose length is disposed at an oblique angle to the shank, and a plurality of reversely arranged devices carried by the head adapted for engaging the air brake hose.

4. A tool for manipulating air brake hose, comprising a shank having a head provided with means for grasping the air brake hose, said shank having an offset part where it joins the head.

5. A tool for manipulating air brake hose, comprising a shank having a head provided with means for engaging the air brake hose, said shank having an offset part where it joins the head; said head being disposed at an oblique angle to the shank.

6. A tool for manipulating air brake hose, comprising a shank, a device carried thereby for engaging the hose, and a device for detachably securing the shank to the car to prevent turning of said shank.

7. A tool for manipulating air brake hose, comprising a shank, a device carried thereby for engaging the hose, and an independent attaching device having means to detachably engage the shank, said attaching device being adapted to connect the shank to the car to prevent turning of said shank.

In testimony whereof, I hereunto affix my signature in presence of two witnesses.

CHARLES GEISKING.

Witnesses:
ROLAND C. BOOTH,
W. R. DENEHEY.